United States Patent [19]

Fitzmaurice

[11] 4,335,570

[45] Jun. 22, 1982

[54] HARVESTING SHAKER FOR CROPS SUCH AS TOMATOES OR THE LIKE

[75] Inventor: Richard W. Fitzmaurice, Santa Clara, Calif.

[73] Assignee: FMC Corporation, Chicago, Ill.

[21] Appl. No.: 182,259

[22] Filed: Aug. 28, 1980

[51] Int. Cl.³ .................................................. A01D 45/00
[52] U.S. Cl. ...................................... 56/327 R; 56/330; 56/13.9
[58] Field of Search .................... 56/327 R, 330, 13.9; 130/30 R

[56] References Cited

U.S. PATENT DOCUMENTS

| | | | |
|---|---|---|---|
| 3,344,591 | 10/1967 | Christie et al. | 56/330 |
| 3,760,574 | 9/1973 | Tassone | 56/330 |
| 3,986,561 | 10/1976 | Bettencourt et al. | 130/30 R |
| 4,147,017 | 4/1979 | Cortopassi et al. | 56/327 R |
| 4,157,005 | 6/1979 | Orlando et al. | 56/327 R |
| 4,232,506 | 11/1980 | Studer | 56/327 R |
| 4,234,045 | 11/1980 | Porter | 56/327 R |

*Primary Examiner*—Robert A. Hafer
*Attorney, Agent, or Firm*—Henry M. Stanley; Richard B. Megley

[57] ABSTRACT

An improved direct-loading crop harvester for vine crops is disclosed as having a shaker head capable of being rotatively oscillated about its axis and having tines adapted to engage the vines of the crop to be harvested. A support conveyor is provided to support the vines while the tines of the shaker head shake the fruit therefrom. A collector conveyor is provided to collect the fruit as it falls from the vines and to transport the fruit for further processing.

16 Claims, 12 Drawing Figures

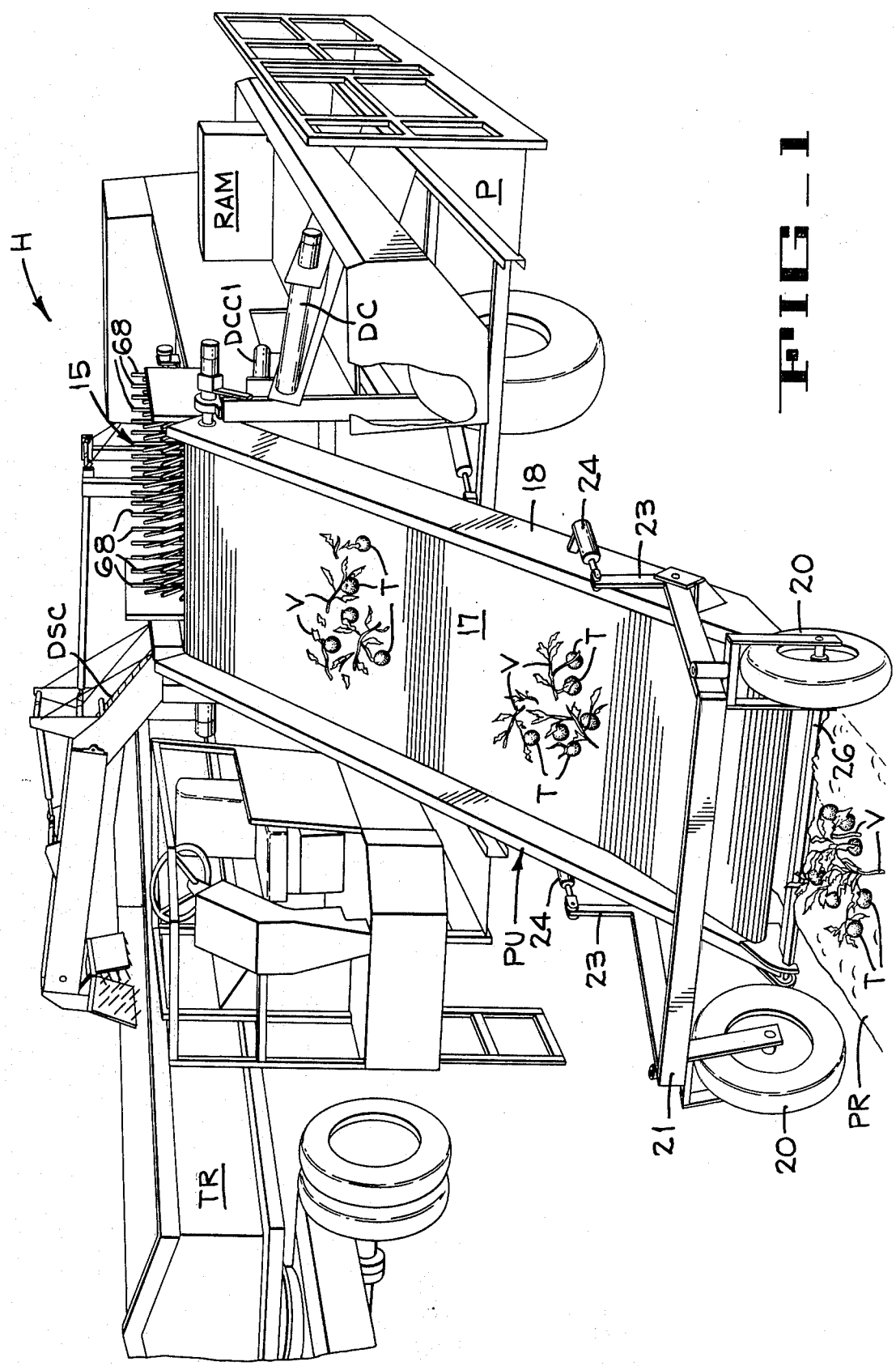

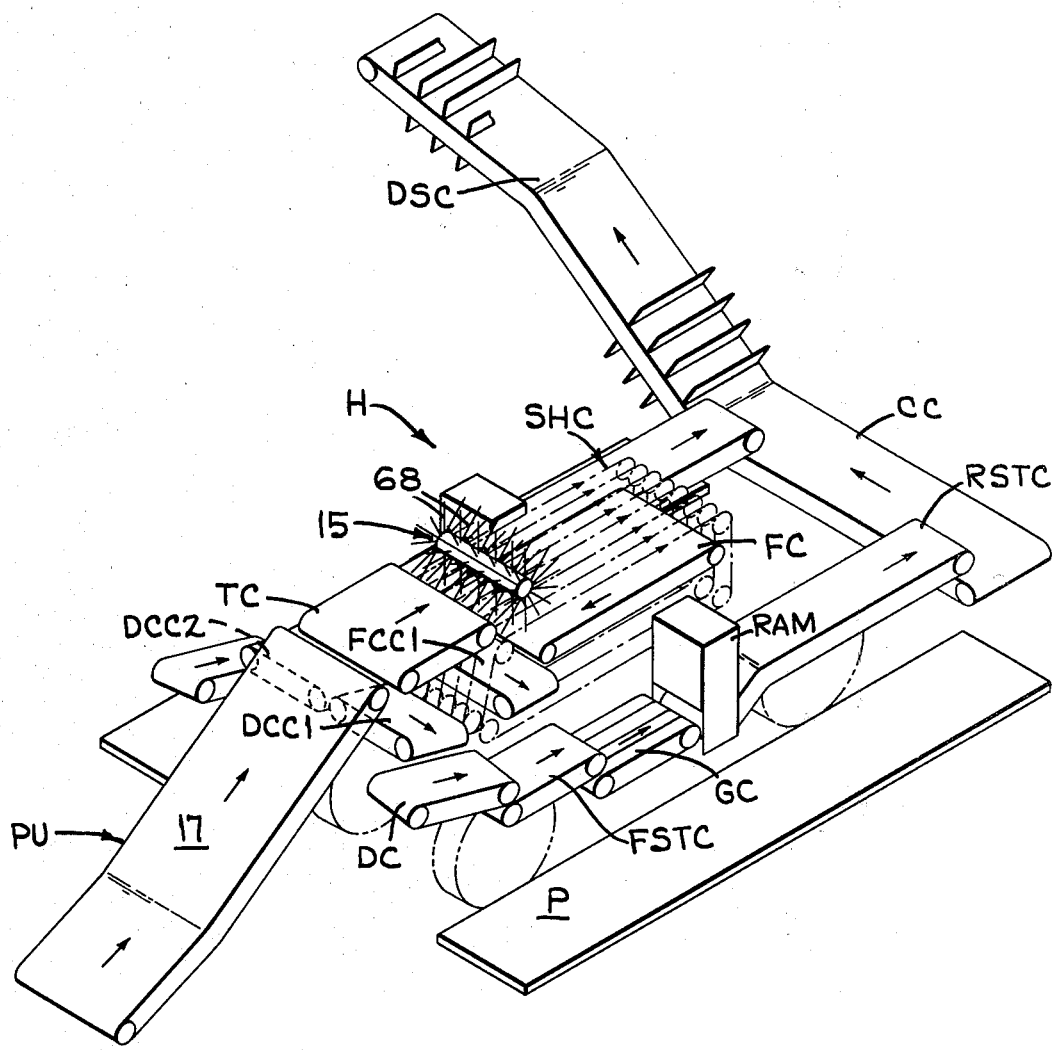
FIG_2

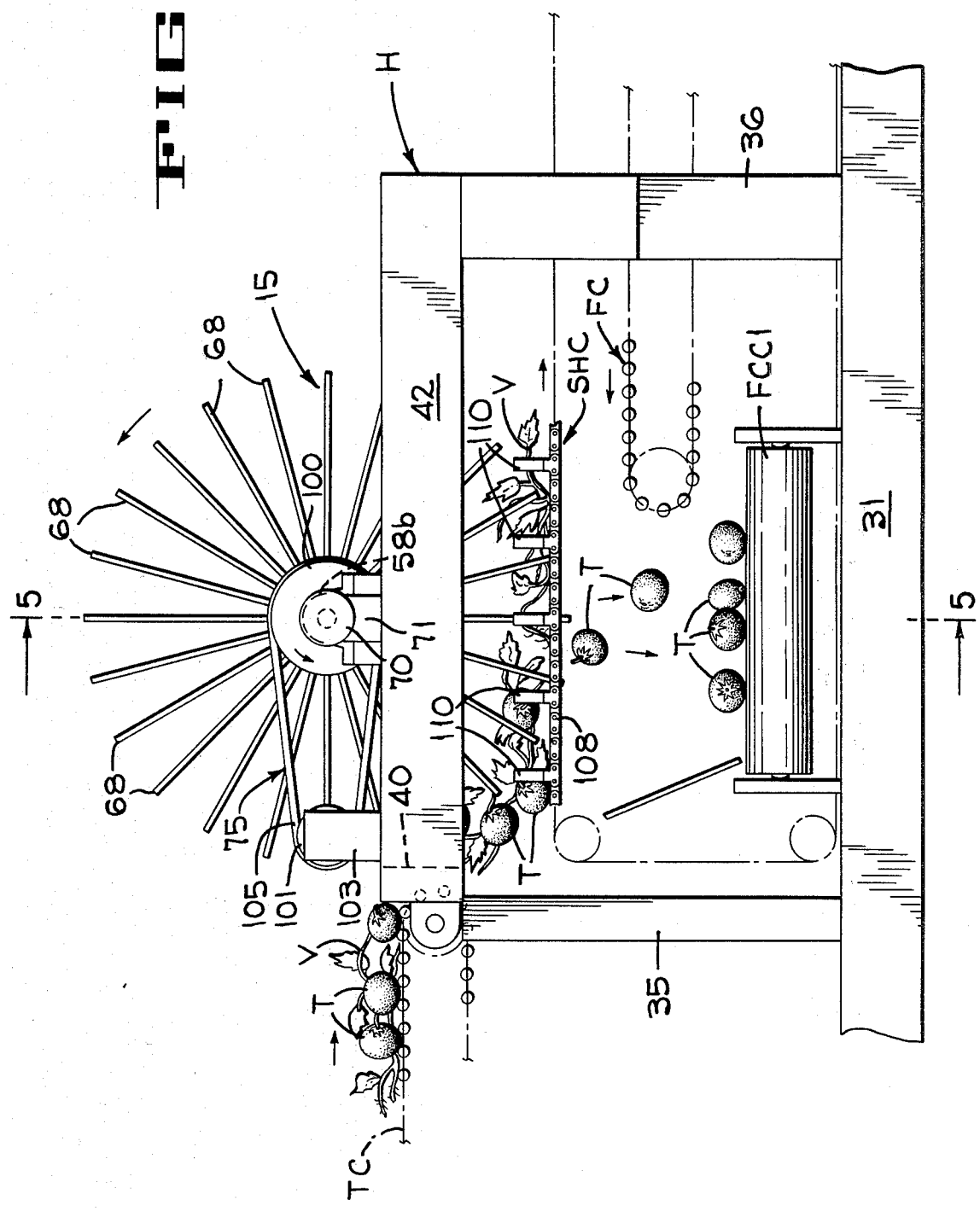

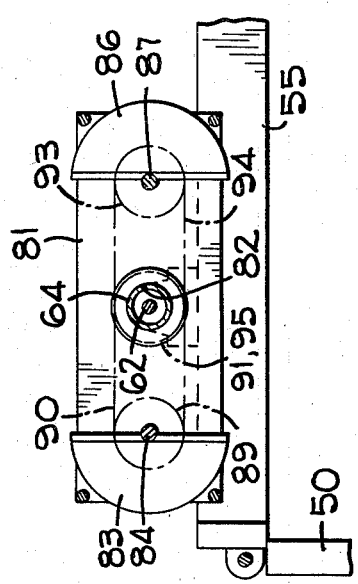
FIG_6
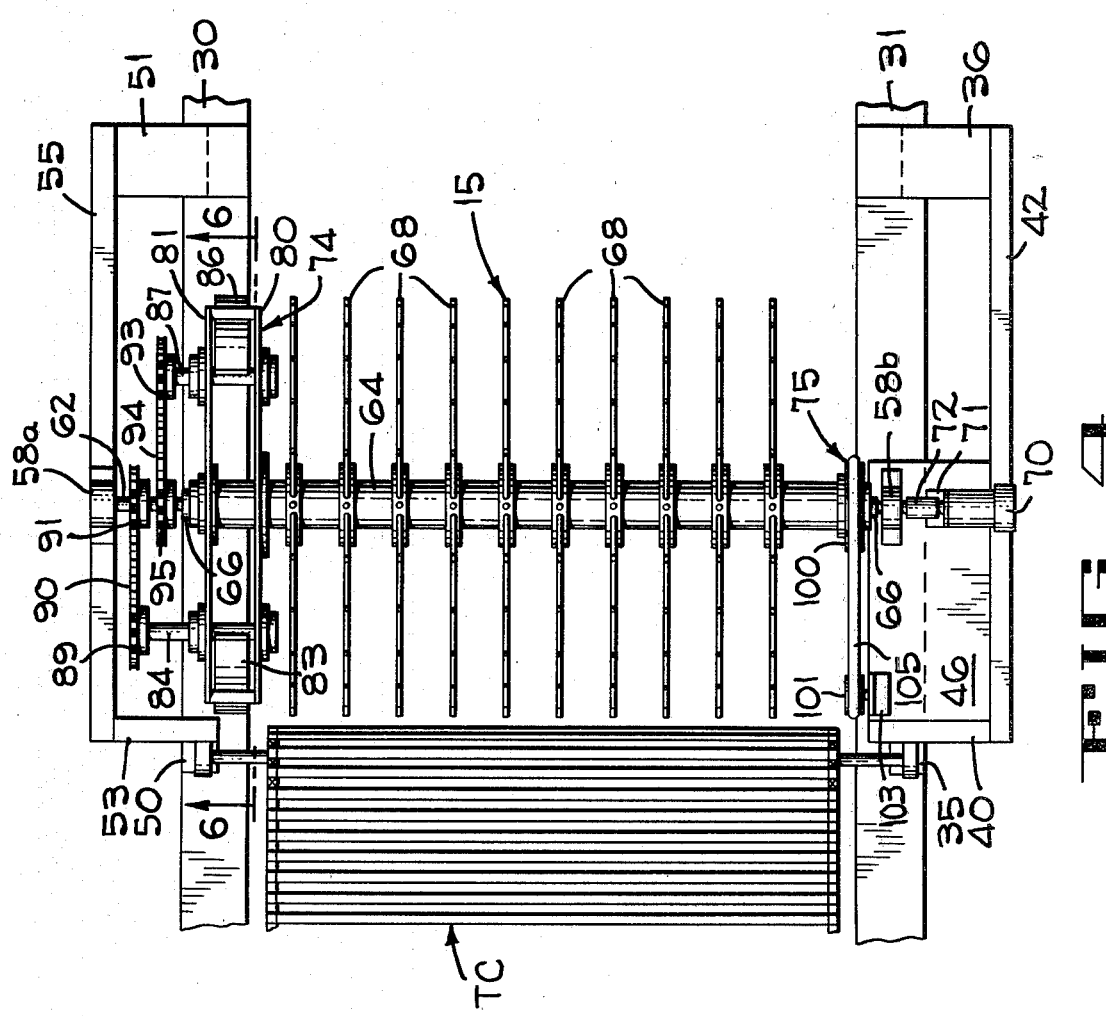
FIG_4

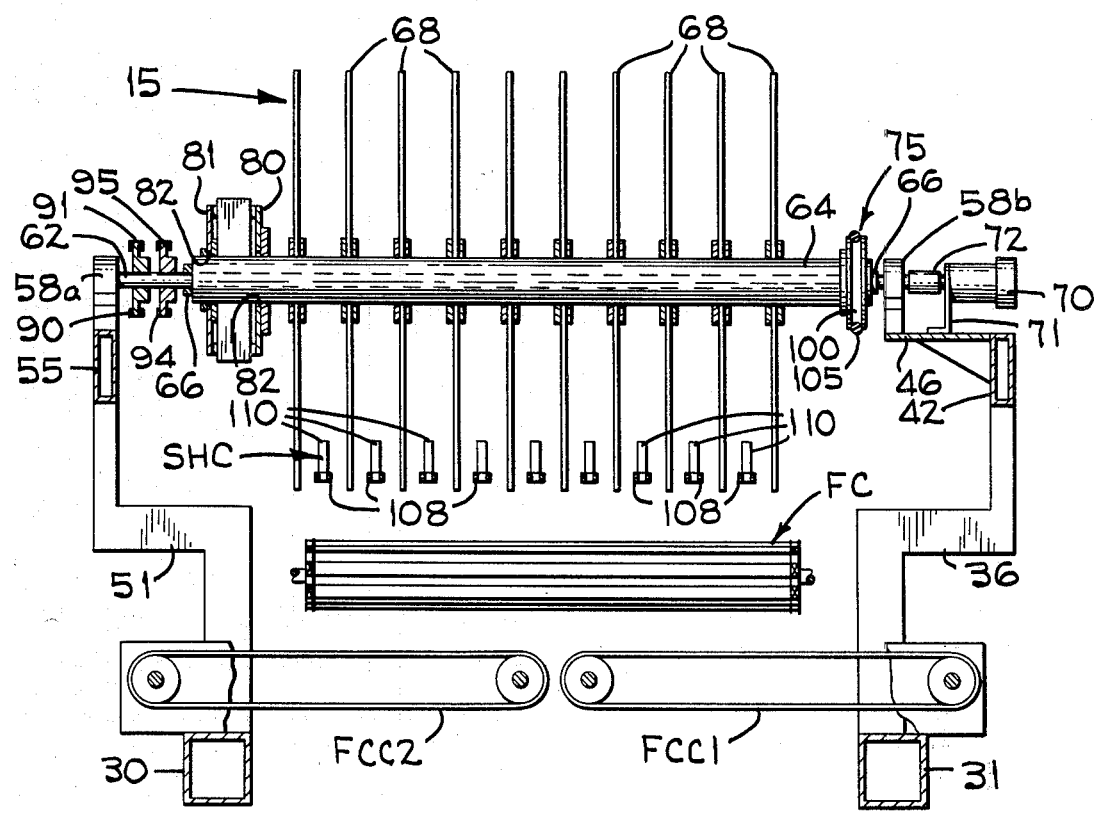

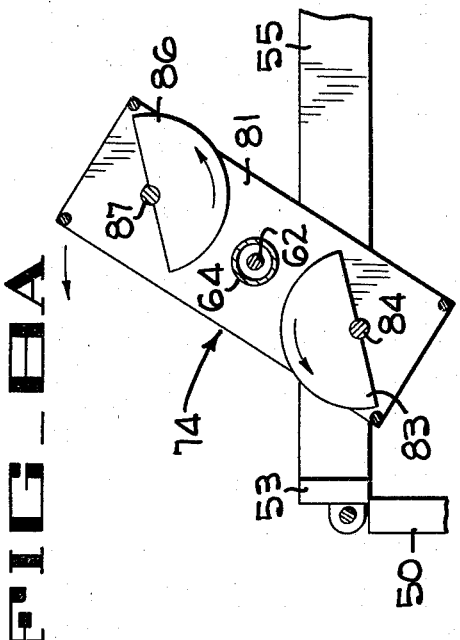
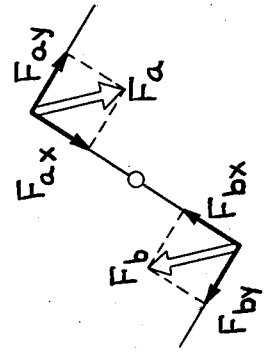
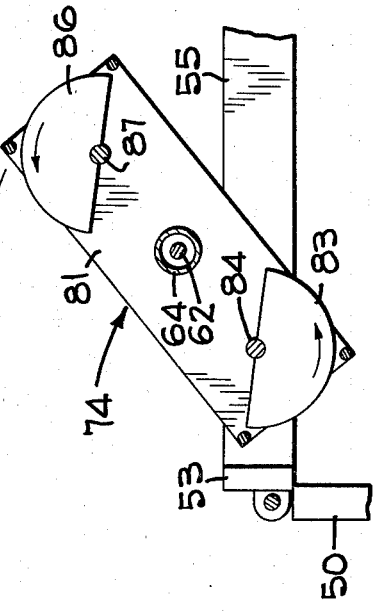
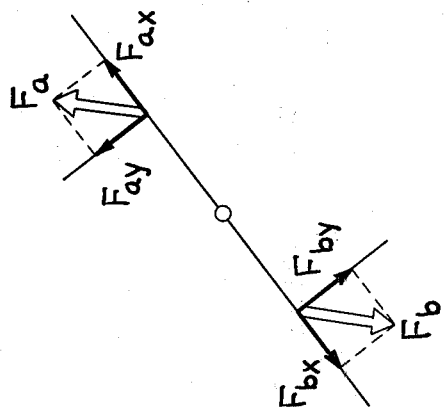

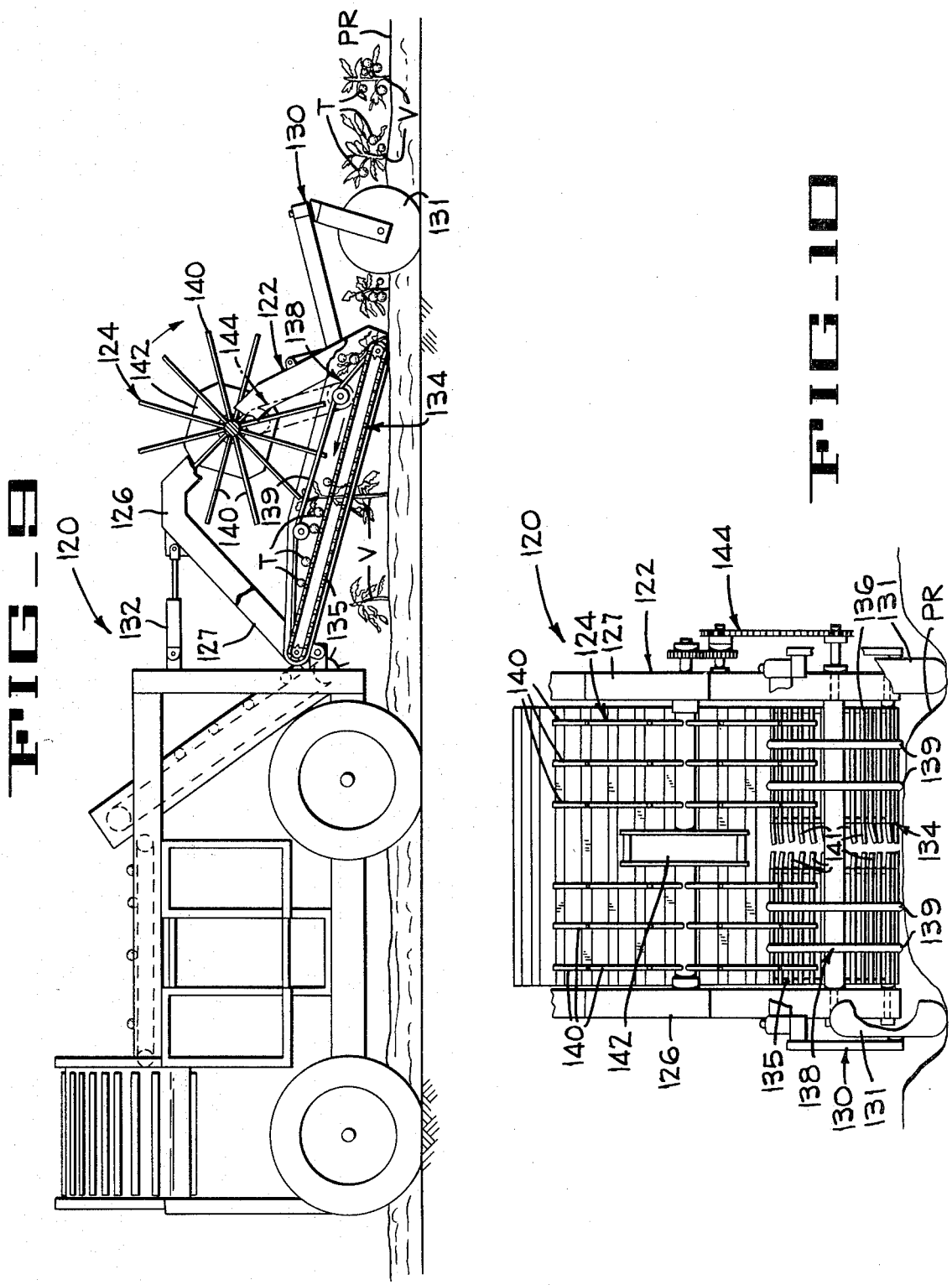

HARVESTING SHAKER FOR CROPS SUCH AS TOMATOES OR THE LIKE

BACKGROUND OF THE INVENTION

1. Field of the Invention

This invention generally relates to apparatus for harvesting above-ground vegetable crops, such as tomatoes. More particularly, the present invention concerns harvesters of the type which include a shaking mechanism for removing fruit from the vine and means for collecting said fruit.

2. Description of the Prior Art

Direct-loading harvesters have been known in the art for many years and have recently enjoyed wide-spread use in the harvesting of tomatoes. Typically, such harvesters are arranged to harvest tomato plants grown in rows, to elevate the harvested plants to shaker conveyors for separating tomatoes from their vines, to carry the tomatoes from the shaker conveyors to sorter conveyors where undesired tomatoes and trash are removed, and finally to elevate the remaining tomatoes from the harvester to an attendant truck or trailer for delivery to processing plants.

The shaker conveyor on a conventional harvester is mounted on the main frame of the harvester and comprises a plurality of endless parallel conveyor chains that are transversely spaced to allow the tomatoes to drop therebetween to an underlying collection conveyor. The shaking action which causes the tomatoes to separate from the vines is imparted by oscillating a subframe on which the shaker conveyor is mounted either transversely or longitudinally with respect to the main frame. The conveyor chains are provided with outwardly extending fingers which engage the tomato vines and aid in transmitting the shaking force to the vines. Such shaker conveyors are disclosed in U.S. Pat. No. 3,071,196 to Scheidenhelm and U.S. Pat. No. 4,174,755 to Siri.

Shaker conveyors of the type described above have proved to have a serious maintenance problem. The shaking action places severe strain on the chains of the shaker conveyor leading to frequent breakage of the links and consequent downtime of the harvester. It is therefore desirable that a harvester be provided with a shaking mechanism which will operate for long periods of time without requiring maintenance. Specifically, it is desirable to have a shaking mechanism which does not impart severe stress to the shaker conveyor as is the case in the prior art.

SUMMARY OF THE INVENTION

The present invention provides a shaker head mounted transversely on the harvester and disposed above a support conveyor adapted to elevate the tomato vines. The shaker head has a plurality of radially projecting tines adapted to penetrate the tomato vines as they pass therebeneath and while they are being conveyed on the support conveyor. A rotative oscillation is induced in the shaker head and imparted to the tomato vines by the tines, and the resulting shaking of the vines disengages the fruit therefrom. The support conveyor is further adapted to allow the tomatoes to fall to a collector conveyor located beneath the support conveyor.

In one particular embodiment of the invention, support conveyor is mounted on the main frame of the harvester and adapted to receive the tomato vines which have been severed from the ground and elevated by a pickup conveyor.

In a second particular embodiment of the invention, the shaker head is mounted on a pickup header frame and is adapted to engage the tomato vines while said vines remain rooted in the ground. The support conveyor is mounted on the pickup header frame and comprises a plurality of endless chains which allow the stalk of the tomato plant to pass therethrough. The collector conveyor is also adapted to allow the stalk of the vine to pass through the middle thereof.

BRIEF DESCRIPTION OF THE DRAWINGS

FIG. 1 is a perspective view of a tomato harvester illustrating the shaker head of the present invention.

FIG. 2 is a schematic representation of the tomato harvester illustrating the paths taken by the tomatoes, vines and debris after they are harvested.

FIG. 3 is an enlarged fragmentary detail illustrating the mounting of the shaker head on the harverster frame.

FIG. 4 is a plan view of the shaker head illustrating the drive means thereof.

FIG. 5 is a reduced fragmentary section taken along line 5—5 of FIG. 3.

FIG. 6 is a fragmentary section taken along line 6—6 of FIG. 4.

FIG. 7A is a sectional view similar to FIG. 6 except that the eccentric weight assembly has been rotated through a small counterclockwise arc.

FIG. 7B is a vector diagram illustrating the forces exerted by the eccentric weight assembly as shown in FIG. 7A.

FIG. 8A is a view similar to FIG. 7A except that the eccentric weight assembly has been rotated through an additional small counterclockwise arc.

FIG. 8B is a vector diagram illustrating the forces exerted by the eccentric weight assembly as shown in FIG. 8A.

FIG. 9 is a diagrammatic side elevation view with portions being broken away illustrating an alternate embodiment of the invention.

FIG. 10 is a diagrammatic front elevation view with portions being broken away illustrating the alternate embodiment of the invention.

DESCRIPTION OF THE PREFERRED EMBODIMENTS

The shaker head assembly 15 of the present invention is mounted on a tomato harvesting machine H, as illustrated in FIG. 1. The tomato harvesting machine H is adapted to harvest tomatoes T from vines V grown in a row on an elongate planting ridge PR. The harvesting machine H is designed to proceed along the planting ridge PR, sever the tomato vines V near ground level, elevate the vines for further processing, separate the tomatoes from the vines, and transfer the tomatoes to an awaiting truck TR. The purpose of the shaker head assembly 15 is to separate the tomatoes T from the tomato vines V during the initial stages of processing.

The tomato harvesting machine H includes a pickup mechanism PU comprising a pickup conveyor 17 mounted in a header frame 18, said header frame being pivotally attached to the main frame of the harvester H. The front end of the header frame 18 is supported by a pair of wheels 20 mounted on a U-shaped support frame 21 which is pivotally attached to the front end of said header frame. A pair of lever arms 23 extend upward from the U-shaped support frame 21 and are adapted to raise and lower said support frame with respect to the front end of the header. A pair of hydraulic piston and cylinder assemblies 24 are attached to the distal ends of the lever arms 23 at the piston rod and to the header frame 18 at the cylinder end. Actuation of the cylinder assemblies 24 allows the distance that the front end of the pickup mechanism PU travels above the ground to be adjusted.

A cutting means is provided at the front end of the pickup mechanism PU to sever the tomato vines at or near the ground level. The cutting means may be of various types, and a rotating cutting bar 26 is illustrated in FIG. 1. The cutting bar 26 is rotatably attached at both ends to the header frame 18 and is rotated by a hydraulic motor (not shown). As the harvester H is driven forward, the cutting bar 26 encounters the individual vines V and severs them near the ground. After severing, the vines V fall onto the pickup conveyor 17 and are elevated for further processing on the main frame of the harvester, as will be described hereinafter.

Referring to FIG. 2, the overall operation of the tomato harvester H will now be described in general terms. A longitudinal transfer conveyor TC is adapted to receive the tomatoes T and vines V from the pickup conveyor 17. There is a small gap between the discharge end of the pickup conveyor 17 and the receiving end of the transfer conveyor TC which allows loose tomatoes, dirt clods and other debris to drop from the vines in transit. These loose tomatoes and debris fall onto one of two short, cross conveyors DCC1, DCC2 which transfer them to the left side and the left side, respectively, of the harvester H, (FIG. 2). It should be noted that the further processing undergone on both sides of the harvester H is identical and that such processing will be described only for the left side of the machine which is fed by cross conveyor DCC1.

The tomatoes, dirt and other debris are discharged from DCC1 onto an inclined, longitudinal dirt conveyor DC which is adapted to permit loose tomatoes to roll down the conveyor while the dirt and other debris are conveyed upward and discharged from the harvester. The tomatoes fall from dirt conveyor DC to a front sorter conveyor FSTC positioned at the rear end of the dirt conveyor DC. Sorters, who stand on platform P, manually remove undesirable tomatoes and dirt that may have reached the front sorter conveyor FSTC.

The transfer conveyor TC discharges vines V with attached tomatoes T to the shaker conveyor SHC composed of a plurality of parallel chains which are driven to carry the vines rearward on the harvester H. The shaker head assembly 15 is positioned at the front end of the shaker conveyor SHC and is adapted to engage the vines supported thereon and to induce a shaking which causes the tomatoes to fall from the vines. The shaker head assembly 15 is the subject of the present invention and will be discussed in detail hereinafter.

The tomatoes T which have been disengaged by the shaker head assembly 15 fall through the openings between adjacent chains of the shaker conveyor SHC onto a fruit conveyor FC located beneath the shaker conveyor SHC and adapted to carry the fruit in the forward direction on the harvester. The fruit conveyor FC carries the tomatoes forward on the harvester H and discharges them onto either of two cross conveyors FCC1 and FCC2, with only the cross conveyor FCC1 being visible in FIG. 2. It should be noted that a number of the tomatoes fall directly onto the cross conveyors since the fruit conveyor FC does not extend fully forward.

The fruit which has fallen onto cross conveyor FCC1 is discharged onto front sorter conveyor FSTC where it joins the fruit directed there by the inclined dirt conveyor DC. The fruit which is fallen onto the other cross conveyor FCC2 is discharged to the other side of the machine where it joins the second processing line. The tomatoes discharged from the front sorter conveyor FSTC, having been manually and mechanically sorted to remove unsuitable tomatoes and debris, are directed to an automatic color sorter RAM where further undesirable tomatoes may be ejected from the harvester H.

In preparation for the automatic color sorting, the tomatoes are discharged from the front sorter conveyor FSTC onto a groove conveyor GC where the tomatoes fall naturally into grooves formed on the belt surface and are thus arranged into rows. The tomatoes are then fed into the automatic color sorter RAM, and only the desirable tomatoes (with red coloring) are directed onto the rear sorter conveyor RSTC. Sorters standing on platform P generally at the rear of the harvester H, remove any remaining unsatisfactory tomatoes and dirt, and other debris.

The inspected tomatoes are then discharged onto the cross feed conveyor CC where they join the inspected tomatoes from the other side of the harvester H, all tomatoes then being directed to the right hand side of the harvester H. From the cross conveyor CC, the tomatoes are directed to the discharge conveyor DSC where the tomatoes are elevated and discharged into a receiving truck TR (FIG. 1) which travels alongside the harvester H. For a fuller description of the harvester structure, reference is made to U.S. Pat. No. 4,157,005 to Franklin P. Orlando et al.

Referring to FIGS. 3, 4 and 5 the mounting of the shaker assembly 15 onto the main frame of the harvester H will now be explained. The main frame of the harvester H includes two longitudinal frame members 30, 31 located on opposite sides of the machine. Frame member 30 is located on the right hand side of the machine, and frame member 31 is located on the left hand side of the machine.

A front support member 35 (FIGS. 3 and 4) projects upward from the left longitudinal frame member 31 and is attached thereto. A rear support member 36 is also attached to left longitudinal frame member 31 and spaced to the rear of front support member 35. The rear support member 36 contains two 90° bends so that its top is outwardly displaced from its bottom, as illustrated in FIG. 5. A horizontal support member 40 (FIG. 4) is attached to the top of the front support member 35 and extends outwardly in relation to the harvester H. A beam 42 extends from the outermost end of the horizontal member 40 rearward to the top of the rear support member 36 and is attached at both ends. A support platform 46 is suspended from the forward, inner edge of the beam 42 and abuts the horizontal support member 40, as illustrated in FIGS. 4 and 5. The platform 46 forms the base for mounting the shaker head assembly 15 on the left hand side of the harvester H.

The right hand side of the harvester H (FIG. 5), also includes a front support member 50 (FIG. 4) and a rear support member 51, similar to the corresponding support members on the left hand side of the machine. A horizontal support member 53 (FIG. 4) extends outward from the top of the front support member 50.

Secured to the outer end of the horizontal support 53 is a beam 55, said beam extending rearward to the rear support member 51 and being attached thereto.

Unlike the left hand side of the machine, the right hand side does not require a support platform to mount the shaker head assembly 15. The shaker head assembly is secured by a single bearing mount 58a which receives a drive shaft 62 which extends through the shaker head assembly. A second bearing mount 58b is fixed to the support platform 46 and receives the other end of the drive shaft 62 therethrough. The drive shaft is free to rotate within the bearing mounts, as will be described hereinafter.

The shaker head assembly 15 includes the drive shaft 62, a freely rotating hub 64 having bearings 66 at either end, said bearings being journalled on said drive shaft 62, thus allowing said hub to rotate freely about said drive shaft, a plurality of tines 68 mounted on said hub 64 and projecting radially therefrom, a motor 70 mounted on the platform 46 by means of a bracket 71 and attached to the drive shaft 62 by a coupling 72, an eccentric weight assembly 74 attached to the hub 64 and adapted to impart a rotary oscillation thereto, and a brake assembly 75 connected between the rotating hub 64 and the platform 46 and adapted to restrain the free rotation of the hub.

The construction of the eccentric weight assembly 74 is best illustrated in FIGS. 4, 5 and 6. The assembly 74 comprises a pair of faceplates 80, 81 having holes 82 adapted to receive the hub 64 therethrough. The face plates 80, 81 are rigidly secured to the hub 64 so that rotational force is transmitted directly from the plates to the hub, and vice versa. A first eccentric weight 83 is rotatably mounted on a shaft 84 extending between the faceplates at one end of the assembly 74, and a second eccentric weight 86 is rotatably mounted on a second shaft 87 at the opposite end of the assembly 74. Shaft 84 extends outward (relative to the harvester frame) from the assembly 74 and has a sprocket 89 mounted at its end. An endless chain 90 connects sprocket 89 with a corresponding sprocket 91 mounted on the drive shaft 62. Similarly, shaft 87 has a sprocket 93 mounted at its end, and an endless chain 94 connects the sprocket 93 with a corresponding sprocket 95 mounted on the drive shaft 62. Thus, the eccentric weights 83, 86 may be rotated in a phased relationship by rotating the drive shaft 62 and by choosing corresponding sprockets having the same diameter. Furthermore, it will be appreciated that the speed of rotation of the eccentric weights 83, 86 is substantially independent of the rotation, if any, of the hub 64 since the hub rotates freely with respect to the drive shaft 62. The eccentric weights will rotate along with the hub, but that effect will be small so long as the drive shaft is rotated much more rapidly than the hub.

The brake assembly 75 is best viewed in FIGS. 3 and 4. Said brake assembly comprises a pulley 100 fixed to the hub 64 and adapted to rotate therewith, a second pulley 101 attached to a vertical plate 103 which projects upward from the support platform 46 and is attached thereto, and a belt 105 connecting the pulleys 100 and 101. The pulley 101 is fixed to plate 103 so that it cannot rotate relative to said plate. As the hub 64 turns, friction between the belt 105 and the pulley 101 exerts a drag on the rotation of said hub. The amount of drag may be adjusted by varying the tension on the belt 105 and is chosen so that the hub 64 will rotate as a result of interaction between the tines and the tomato vines carried by the shaker conveyor SHC, but will not rotate otherwise.

The shaker head assembly 15 operates by inducing a longitudinal oscillation in the tomato vines V carried by the shaker conveyor SHC. The shaking motion so induced causes the tomatoes to fall from the vine through the gaps between adjacent chains of the shaker conveyor SHC and onto the removal conveyor system as described hereinbefore.

The pickup conveyor 17, (FIG. 1), the transfer conveyor TC, and the shaker conveyor SHC are all driven at speeds approximating the ground speed of the harvester H. In this way, the vines V remain on the shaker conveyor SHC for a maximum amount of time without overcrowding. The shaker conveyor SHC includes nine individual chains 108, as best illustrated in FIG. 5. Each chain 108 has a plurality of spikes 110 spaced longitudinally thereon. The spikes 110 engage the tomato vines V as they fall from the transfer conveyor TC and prevent the vines from falling through spaces between adjacent chains. The shaker conveyor SHC is driven in the rearward direction as indicated by the arrow in FIG. 3. The individual chains 108 of the shaker conveyor SHC are arranged so that the tines 68 of the shaker assembly 15 penetrate the spaces between adjacent chains. At their deepest penetration, the tines 68 penetrate below the bottom of the chains 108, as seen in FIG. 3. Since the hub 64 of the shaker head assembly 15 rotates freely about the drive shaft 62 (ignoring for the moment the effect of the brake assembly 75), the shaker head assembly 15 is rotated by contact with the tomato vines being carried by the shaker conveyor. The ends of the tines 68 are thus rotated at a velocity equal to the speed of the shaker conveyor SHC, i.e., 1 mile per hour which is equivalent to 10 rpm in the counterclockwise direction, as indicated by the arrow in FIG. 3.

Imposed on the counterclockwise rotation is the rotational oscillation imparted by the eccentric weight assembly 74. Successful harvesting has been achieved with an oscillation in the range from 300 to 500 cps with a rotational displacement in the range from 3 to 4 inches at the ends of the tines 68. The tines may be provided with weighted tips to increase the momentum transferred to the vines.

The purpose of the brake assembly 75 is to prevent the rotation of the shaker assembly 15 under the influence of the eccentric weight assembly 74 when there are no vines on the shaker conveyor SHC. It has been found that the shaker assembly can rotate at speeds much greater than 10 rpm under such circumstances, posing a danger to personnel working nearby. The brake assembly provides sufficient drag to prevent such "free wheeling".

The use of eccentric weights to impose rotational oscillation is well known in the prior art. Referring to FIGS. 7A, 7B, 8A and 8B, the operation of the eccentric weight assembly 74 of the present invention will be briefly explained. The eccentric weights 83, 86 are each half-discs rotatably mounted on shafts 84, 87, respectively. Both eccentric weights 83 and 86 are driven by rotation of the drive shaft 62, as explained hereinbefore. Since the corresponding sprockets (89, 91 and 93, 95) associated with each weight are of the same size, it will be appreciated that the weights will be driven at the same speed. Furthermore, the weights are always maintained 180° out of phase regardless of the orientation of the shaker head.

FIG. 7A illustrates the relative positions of the eccentric weights 83, 86 as they might appear at a given instant in time. The eccentric weight assembly 74 is being rotated in the counterclockwise direction as a result of the force exerted by the tomato vines V on the tines 68. At the same time, both eccentric weights 83, 86 are being rotated at a much higher rpm by the drive shaft 62 which is driven by motor 70.

The forces exerted by the rotation of each of the eccentric weights are illustrated in FIG. 7B. A force $F_a$ exerted by the second eccentric weight 86 resolves into force $F_{ax}$ in the radial direction and $F_{ay}$ in the tangential direction. Similarly, a force $F_b$ exerted by eccentric weight 83 resolves into forces $F_{bx}$ in the radial direction and $F_{by}$ in tangential direction. Since the weights 83 and 86 have identical dimensions, the forces $F_a$ and $F_b$ will have the same magnitude. Since the weights 83 and 86 are driven 180° out of phase, the forces $F_a$ and $F_b$ will be in the opposite direction. Therefore, the radial forces $F_{ax}$ and $F_{bx}$ have identical magnitudes and are in the opposite direction which leaves a net radial force of zero. The tangential forces $F_{ay}$ and $F_{by}$ also have identical magnitude and are in opposed relation. However, since the tangential forces are exerted at the opposite ends of a lever arm, the net result of the forces is a couple which tends to rotate the eccentric weight assembly in the counterclockwise direction.

FIG. 8A illustrates the eccentric weight assembly 74 as it might appear a fraction of a second after the time illustrated in FIG. 7A. The assembly 74 has traveled a short arc in the counterclockwise direction while the eccentric weights 83, 86 have each rotated approximately 180°, also in the counterclockwise direction. The forces $F_a$ and $F_b$ exerted by each weight now lie in the opposite direction as before. The resolution of forces illustrated in FIG. 8B is similar to that in FIG. 7B, except that the tangential forces $F_{ay}$ and $F_{by}$ lie in the opposite direction from that of FIG. 7B. Thus, the couple forces now act to rotate the eccentric weight assembly 74, and thus the shaker assembly 15, in the clockwise direction.

It will be appreciated that the direction of the tangential forces will change twice during each revolution of the eccentric weights. Since the weights are driven at approximately 400 rpm, the rotational oscillation will have a frequency of approximately 400 cycles per minute equal to 17 cycles per second. The dimensions of the eccentric weight assembly and the weights of the eccentric weights are chosen so that the rotational displacement will lie in the range of from 3 to 4 inches.

The shaking action is imparted by the tines 68 directly to the tomato vines V causing tomatoes to separate from the vines and fall to the collection conveyors below. The shaking action is imparted through the tomato vines V to the shaker conveyor SHC so that the vines continue to shake even when they fall out of contact with the tines 68. Thus, tomatoes are disengaged subsequent to direct contact with the shaker head assembly 15. The remainder of the handling of the tomatoes T and the tomato vines V are as described in the aforementioned patent to Orlando et at, U.S. Pat. No. 4,157,005.

A second embodiment of the present invention is illustrated in FIGS. 9 and 10. A second harvester 120 includes a pickup header 122 pivotally attached at its rear end to the main frame of the harvester 120, and a shaker head assembly 124 mounted on said pickup header 122 rather than on the main frame of the harvester. The pickup header 122 is especially adapted to elevate the branches of the tomato vines V while leaving said vines rooted in the ground, as will be explained hereinafter. By having the shaker head 124 mounted on such a pickup header, the tomatoes T may be disengaged from the vine without the necessity of severing the vine from the ground, thus reducing the amount of debris picked up and conveyed to the main frame of the harvester 120.

The pickup header 122 comprises two outer frame members 126, 127 which are respectively located on the right hand side and the left hand side of the harvester as viewed in FIG. 10. Each of the frame members 126 and 127 is generally triangularly shaped in elevation, as illustrated in FIG. 9. One corner of the base of the triangle is pivotally attached to the frame of the harvester 120 while the other corner of the base travels adjacent to the ground and is supported by the front end support assembly 130. The top of each triangular support frame member 126, 127 is attached to the main frame by a piston and cylinder assembly 132 which acts to raise and lower the pickup header 122.

The front end support assembly 130 includes a pair of wheels 131 and is constructed similarly to the U-shaped support frame 21 described in connection with the first embodiment. The construction of such a support assembly is wholly conventional and will not be explained further.

The pickup header 122 further includes a collection conveyor 134 comprising two transversely spaced halves 135, 136 with a gap therebetween running longitudinally for the length of the pickup header frame. A support conveyor 138, comprising four individual transversely spaced chains 139, is disposed above the collection conveyor 134 and is adapted to elevate the branches of the tomato vines V from the ground and from the collection conveyor 134.

The branches of the tomato vines V are elevated above the collection conveyor 134 by the conveyor 138 where said branches are engaged by a plurality of vibrating tines 140 mounted on the shaker head 124. The induced vibration causes the tomatoes T to fall to the collection conveyor 134 below, and the tomatoes are then transported to the main frame of the harvester 120 for further processing.

Both the support conveyors 138 and the shaker head 124 are driven at speeds corresponding to the ground speed of the harvester 120 so that the vines V are disturbed as little as possible. As the harvester proceeds forward, the vines remain rooted in the soil as they are elevated, and eventually the branches are pulled through the gap between the conveyor halves 135, 136 after the tomatoes have been disengaged. Each half conveyor 135, 136 is in fact comprised of a plurality of spaced tubular rods each having a flexible tip 141 disposed toward the gap between the conveyors. The flexible tips 141 allow the tomato vine branches to pass through the gap between the conveyors 135, 136 with a minimal disturbance.

The shaker assembly 124 is rotatably suspended between corresponding legs of the triangular frame members 126, 127 and is disposed above the chain support conveyor 138. An eccentric weight assembly 142 is attached to the shaker head assembly 124 and is adapted to induce a rotational oscillation therein. The construction and operation of the eccentric weight assembly 142 is similar to that of the assembly 74 disclosed in connection with the first embodiment of the present invention and will not be described further.

The front end of the pickup assembly 122 is maintained as close to the surface of planting row PR as possible. The harvester 120 is guided so that tomato vines V are received within the gap between the conveyors 135, 136. The branches of the tomato vine V are elevated upon the support conveyor 138 while the trunks of the tomato vines V remain rooted in the ground. The angle between the pickup header 122 and the ground is minimized so that the branches of the vines are elevated gradually, being pulled through the gap only at or near the rear of the pickup header 122.

For the second embodiment of the invention, it is preferable that the shaker head 124 be positively rotated in the clockwise direction (as viewed in FIG. 9) so that the tines 140 aid in moving the branches of the vine up the support conveyor 138. To this end, a drive means 144 is provided to rotate the shaker head 124 at a low rpm so that the ends of the tines travel at a speed approximately equal to the ground speed of the harvester. In this way, the tines 140 aid in elevating the branches up the support conveyor until the height of the conveyor is such that the branches are drawn through the gap between the laterally spaced conveyors 135, 136.

Although the best modes contemplated for carrying out the present invention have been herein shown and described it will be apparent that modification and variation may be made without departing from what is regarded to be the subject matter of this invention.

What is claimed is:

1. In a harvester for vine crops, such as tomatoes, wherein the vines are severed near ground level, removed from the ground, and moved to a position within the harvester framework, an improved means for disengaging fruit from the vine, comprising:
   a shaker head having a plurality of radially projecting tines;
   means for mounting the shaker head on the harvester framework for rotation about a substantially horizontal axis;
   means for inducing a rotative oscillation in the shaker head; and
   a support conveyor assembly mounted on the harvester in fixed position relative to the framework and adjacent to said shaker head and operating to support the severed vines in position so that the tines on the shaker head penetrate the vines and induce a shaking action therealong which disengages the fruit from the vines.

2. In a harvester for vine crops, such as tomatoes, wherein the vines are severed near ground level, removed from the ground, and moved to a position within the harvester framework, an improved means for disengaging fruit from the vine, comprising:
   a shaker head having a plurality of radially projecting tines, said shaker head being rotatably mounted on the harvester and having an axis of rotation lying normal to the direction of travel of the harvester and in a horizontal plane;
   means for inducing a rotative oscillation in the shaker head;
   a support conveyor assembly mounted on the harvester in fixed position relative to the framework and adjacent to said shaker head, and operating to support the severed vines so as to permit the radially projecting tines of the shaker head to penetrate the vines and induce a shaking action which disengages the fruit from the vines along the length of said support conveyor; and
   a collector conveyor disposed beneath the support conveyor and adapted to collect the fruit as it falls from the vines.

3. In a harvester for vine crops, such as tomatoes, said harvester having a main frame movable along a path and a pickup header frame pivotally attached at its rearward end to the main frame, wherein the pickup header includes a cutter for severing the vines near the ground so that the pickup header may then move the vines and the fruit to a position within the main frame, an improved means for disengaging fruit from the vine, comprising:
   a shaker head located at the position within the main frame having a plurality of tines projecting radially therefrom;
   means for mounting said shaker head transversely on the main frame so that the axis of rotation of the shaker head lies in a horizontal plane;
   means for inducing a rotative oscillation in the shaker head;
   a support conveyor mounted on the main frame operating to move the vines past the shaker head while permitting penetration of the vines by the tines on the shaker head; said oscillating tines cooperating with said support conveyor to cause shaking of the vines along the length of said support conveyor;
   a collector conveyor disposed beneath the support conveyor and adapted to collect the fruit as it falls from the vines and to transfer the fruit through the main frame of the harvester.

4. A harvester as in claim 3, wherein the support conveyor and the collector conveyor are adapted to permit the vines to remain rooted in the ground during and after the elevation thereof by the pickup header frame.

5. A harvester as in claim 3, wherein the support conveyor includes a plurality of endless chains disposed longitudinally on the pickup header frame.

6. A harvester as in claim 3, wherein the collector conveyor includes a first half and a second half, said halves having a gap between them running longitudinally for the length of the collector conveyor, said gap adapted to permit the trunks of the vines to pass through the collector conveyor as the harvester proceeds forward.

7. A harvester as in claim 6, wherein the first half and the second half of the collector conveyor are comprised of spaced members which terminate in opposed flexible portions near the middle of the collector conveyor, said flexible portions permitting the trunks of the vines to pass through while forming a substantially continuous collection surface for the fruit to be collected.

8. In a harvester for vine crops, such as tomatoes said harvester having a main frame movable along a path, a pickup header frame pivotally attached at its rearward end to the main frame, means for severing the tomato vine located at the front end of the pickup header frame, and means for elevating the severed tomato vines to the main frame and discharging them thereon, an improved means for disengaging fruit from the vines, comprising:
   a shaker head having a plurality of tines projecting radially therefrom;
   means for transversely mounting said shaker head for rotating motion on the main frame so that its axis of rotation lies in a horizontal plane;

means for inducing a rotative oscillation in the shaker head;

a support conveyor assembly mounted on the main frame in fixed position relative to the main frame and adjacent to said shaker head and operating to support the severed vines while permitting penetration of the vines by the tines of the shaker head, whereby said plurality of tines cooperate with said support conveyor to cause shaking of the vines along the length of said support conveyor; and a collector conveyor disposed beneath the support conveyor and adapted to collect the fruit as it falls from the vines.

9. A harvester as in claims 3 or 8, wherein the shaker head has a rotative oscillation with a frequency in the range from 300 cps to 500 cps and an amplitude in the range from 3 inches to 4 inches.

10. A harvester as in claim 8, wherein a brake is provided to prevent excessive rotation of the shaker head about its axis.

11. A harvester as in claims 3 or 8, wherein the tines on the shaker head have weighted tips to enhance the shaking motion transmitted to the vines.

12. A harvester as in claims 1, 2, 3 or 8 wherein said means to induce a rotative oscillation comprises a pair of eccentric weights mounted for rotation with said shaker head, and means for separately rotating each of said eccentric weights so that alternating force couples are imposed about the axis of the shaker head.

13. A harvester as in claims 1, 2, 3, or 8 wherein said support conveyor has a driven upper run, and wherein said means for mounting said shaker head comprises means for providing free rotation of said head, whereby said shaker head is moved rotationally through the interaction of the vines in accordance with the direction of said upper run drive with said rotative oscillation superimposed thereupon.

14. A harvester as in claim 13 wherein said means for mounting said shaker head further comprises means for braking said rotative oscillation, whereby rotative motion is limited when said means for inducing is operative and there are no vines on said support conveyor.

15. A harvester for vine crops such as tomatoes, wherein a main harvester framework is moveable along a path defined by crop planting rows, a pickup mechanism is attached to the framework, an elevating pickup conveyor assembly is mounted in the pickup mechanism and a cutter is provided at the front of the pickup mechanism to sever the vines in the planting rows near the ground so that they may be positioned on the pickup conveyor and thereby be delivered to a separation position on the harvester with most of the crop still attached to the vines, comprising a shaker assembly mounted on the framework at the separation position including a horizontally disposed drive shaft journalled to the framework for rotating movement relative thereto, a rotating hub journalled to said drive shaft for free rotating movement relative to said shaft, a drive motor mounted on said framework and coupled to said drive shaft, an eccentric weight assembly attached to said rotating hub and free to rotate relative thereto, means for coupling said eccentric weight assembly to said drive shaft whereby oscillatory rotative motion is imparted to said hub when said weight assembly is driven, a shaker conveyor mounted on said framework beneath said rotating hub and disposed in a substantially horizontal plane below the elevated end of the pickup conveyor assembly to receive the vines therefrom, a plurality of tines extending radially from said hub wherein the tips thereof engage and shake vines along the length of said shaker conveyor, and a fruit conveyor located beneath said shaker conveyor for receiving fruit separated from the vines by the oscillatory motion of said hub.

16. A harvester as in claim 15 wherein said shaker assembly further comprises a brake attached to said rotating hub, whereby oscillatory motion thereof is limited when vines are not present on said shaker conveyor.

* * * * *

REEXAMINATION CERTIFICATE (509th)

United States Patent [19]

Fitzmaurice

[11] B1 4,335,570

[45] Certificate Issued May 20, 1986

[54] HARVESTING SHAKER FOR CROPS SUCH AS TOMATOES OR THE LIKE

[75] Inventor: Richard W. Fitzmaurice, Santa Clara, Calif.

[73] Assignee: FMC Corporation, Chicago, Ill.

Reexamination Request:
No. 90/000,684, Dec. 10, 1984

Reexamination Certificate for:
Patent No.: 4,335,570
Issued: Jun. 22, 1982
Appl. No.: 182,259
Filed: Aug. 28, 1980

[51] Int. Cl.⁴ .......................................... A01D 45/00
[52] U.S. Cl. ............................... 56/327 R; 56/13.9; 56/330
[58] Field of Search ............... 56/327 R, 330, 328 R, 56/328 TS; 130/30 R; 171/27, 31, 114, 115, 116, 121

[56] References Cited

U.S. PATENT DOCUMENTS

| | | | |
|---|---|---|---|
| 3,344,591 | 10/1967 | Christie et al. | 56/330 |
| 3,760,574 | 9/1973 | Tassone | 56/330 |
| 3,959,959 | 6/1976 | Louault et al. | 56/330 |
| 3,986,561 | 10/1976 | Bettencourt et al. | 130/30 R |
| 4,147,017 | 4/1979 | Cortopassi et al. | 56/327 R |
| 4,157,005 | 6/1979 | Orlando et al. | 56/327 R |
| 4,232,506 | 11/1980 | Studer | 56/327 |
| 4,234,045 | 11/1980 | Porter | 56/327 R |

OTHER PUBLICATIONS

Paper No. 79-1060, "A Rotary Shaker For Harvesting Tomatoes" by Labo Adekoya and Henry E. Studer, Presentation at the 1979 Summer Meeting of American Society of Agricultural Engineers and Canadian Society of Agricultural Engineering, Jun. 24–27, 1979.

Primary Examiner—Jay N. Eskovitz

[57] ABSTRACT

An improved direct-loading crop harvester for vine crops is disclosed as having a shaker head capable of being rotatively oscillated about its axis and having tines adapted to engage the vines of the crop to be harvested. A support conveyor is provided to support the vines while the tines of the shaker head shake the fruit therefrom. A collector conveyor is provided to collect the fruit as it falls from the vines and to transport the fruit for further processing.

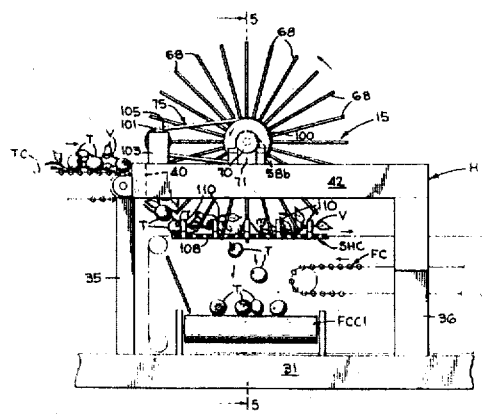

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15 and 16 is confirmed.

Claims 4, 6 and 7 are cancelled.

Claims 1-3 and 8 are determined to be patentable as amended.

Claims 5 and 9-14, dependent on an amended claim, are determined to be patentable.

New claims 17-20 are added and determined to be patentable.

1. In a harvester for vine crops, such as tomatoes, wherein the vines are severed near ground level, removed from the ground, and moved to a position within the harvester framework, an improved means for disengaging fruit from the vine, comprising:
   a shaker head having a plurality of radially projecting tines;
   means for mounting the shaker head on the harvester framework for rotation about a substantially horizontal axis;
   means for inducing a rotative oscillation in the shaker head; and
   [a] *driven* support conveyor [assembly] *means* mounted on the harvester [in fixed position relative to the] *framework* and adjacent to said shaker head [and operating to support] *for moving the severed vines past the shaker head and for supporting the severed vines in a position thereon so that the* tines on the shaker head penetrate the vines and induce a shaking action [therealong] *in the vine mass* which disengages the fruit from the vines.

2. In a harvester for vine crops, such as tomatoes, wherein the vines are severed near ground level, removed from the ground, and moved to a position within the harvester framework, an improved means for disengaging fruit from the vine, comprising:
   a shaker head having a plurality of radially projecting tines, said shaker head being rotatably mounted on the harvester and having an axis of rotation lying normal to the direction of travel of the harvester and in a horizontal plane;
   means for inducing a rotative oscillation in the shaker head;
   [a] *driven* support conveyor [assembly] *means* mounted on the harvester [in fixed position relative to the] *framework* and adjacent to said shaker head [, and operating to support] *for moving the severed vines past the shaker head and for supporting the severed vines so as to permit the radially projecting tines of the shaker head to penetrate the* vines and induce a shaking action *therein* which disengages the fruit from the vines along the length of said support conveyor; and
   a collector conveyor disposed beneath the support conveyor and adapted to collect the fruit as it falls from the vines.

3. In a harvester for vine crops, such as tomatoes, said harvester having a main frame movable along a path and a pickup header frame pivotally attached at its rearward end to the main frame, wherein the pickup header includes a cutter for severing the vines near the ground so that the pickup header may then move the vines and the fruit to a position within the main frame, an improved means for disengaging fruit from the vine, comprising:
   a shaker head located at the position within the main frame having a plurality of tines projecting radially therefrom;
   means for mounting said shaker head transversely on the main frame so that the axis of rotation of the shaker head lies in a horizontal plane;
   means for inducing a rotative oscillation in the shaker head;
   [a] *driven* support conveyor *means* mounted on the main frame [operating to move] *for moving* the vines past the shaker head [while permitting penetration of the vines by] *and disposed in position so that* the tines [on the shaker head; said oscillating tines cooperating with said support conveyor to cause] *penetrate the vines thereby causing* shaking of the vines along the length of said support conveyor *means*;
   a collector conveyor disposed beneath the support conveyor and adapted to collect the fruit as it falls from the vines and to transfer the fruit through the main frame of the harvester.

8. In a harvester for vine crops, such as tomatoes, said harvester having a main frame movable along a path, a pickup header frame pivotally attached at its rearward end to the main frame, means for severing the tomato vine located at the front end of the pickup header frame, and means for elevating the severed tomato vines to the main frame and discharging them thereon, an improved means for disengaging fruit from the vines, comprising:
   a shaker head having a plurality of tines projecting radially therefrom;
   means for transversely mounting said shaker head for rotating motion on the main frame so that its axis of rotation lies in a horizontal plane;
   means for inducing a rotative oscillation in the shaker head;
   [a] *driven* support conveyor [assembly] *means* mounted on the main frame [in fixed position relative to the main frame and] adjacent to said shaker head [and operating to support] *for supporting and moving* the severed vines *past the shaker head* while permitting penetration of the vines by the tines of the shaker head, whereby said plurality of tines cooperate with said support conveyor to cause shaking of the vines along the length of said support conveyor; and
   a collector conveyor disposed beneath the support conveyor and adapted to collect the fruit as it falls from the vines.

*17. A shaker head assembly mounted on a framework of a harvester for vine crops, such as tomatoes, comprising* a shaker conveyor mounted in the framework and driven to convey the vines therealong, said conveyor having spaces between elements in the structure thereof, a hub mounted in the framework free to rotate relative thereto about an axis oriented substantially horizontally in a position above said shaker conveyor, a plurality of tines fixed to and extending substantially radially from said hub and penetrating through said spaces in said shaker conveyor, and means for inducing rotary oscillation in said hub, whereby longitudinal oscillation is induced by said tines in the vines carried on said shaker conveyor and the crop shaken from the vines falls through said spaces.

18. A shaker head assembly as in claim 17 comprising a brake assembly disposed to brake said rotary oscillation, whereby free rotation of said hub is limited when there are no vines to couple said tines and said shaker conveyor.

19. A shaker head as in claim 17 comprising a collector conveyor disposed beneath said shaker conveyor, said collector operating to collect and transfer the crop shaken from the vines.

20. Apparatus for removing a crop, such as tomatoes, from vines in a harvester for vine crops wherein the vines are severed near ground level, and removed from the ground level to a position within the harvester framework, comprising a hub mounted on and being freely rotatable relative to the harvester framework about a substantially horizontal axis, a plurality of tines mounted on and extending substantially radially from said hub, a rotating eccentric weight assembly secured to said hub, means for rotating the eccentric weight assembly at a speed independent of the rotation speed, if any, of said hub, whereby a rotary oscillation is imparted to said hub and tines, means for braking the rotation of said hub, and a shaker conveyor disposed adjacent said hub and tines to receive vines from the position within the harvester framework, and means for driving said shaker conveyor at a controlled speed past the hub and tines, whereby longitudinal oscillation is induced in the vines on said shaker conveyor and the hub rotates while oscillating as a result of interaction between the tines and the vines only.

* * * * *